Patented Dec. 30, 1941

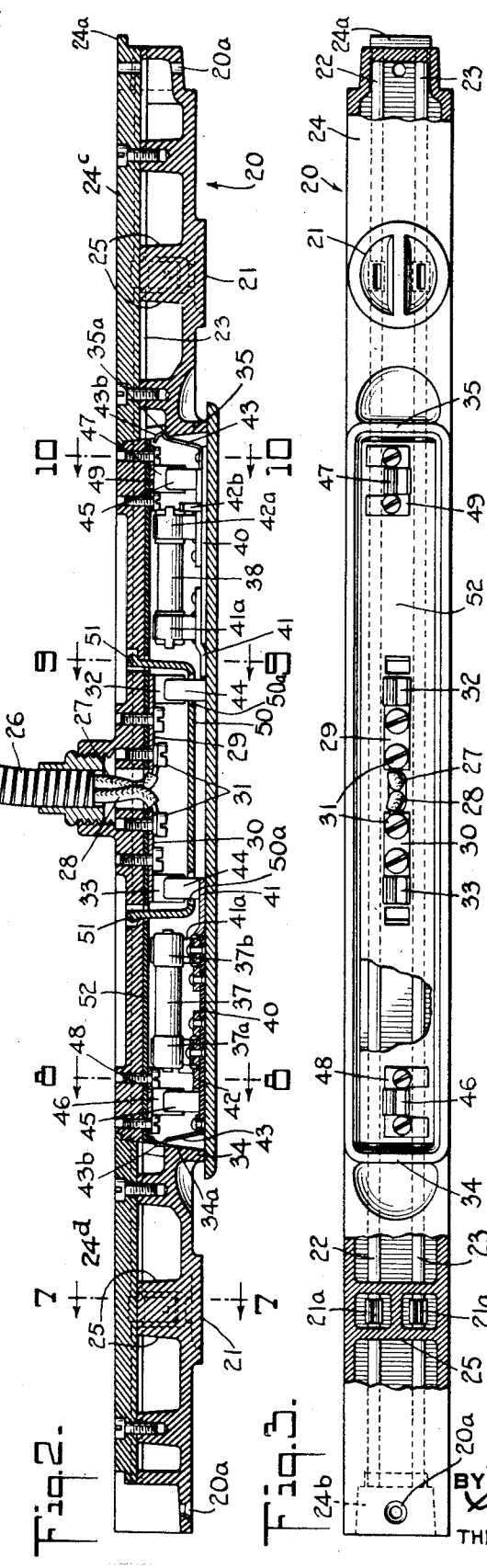

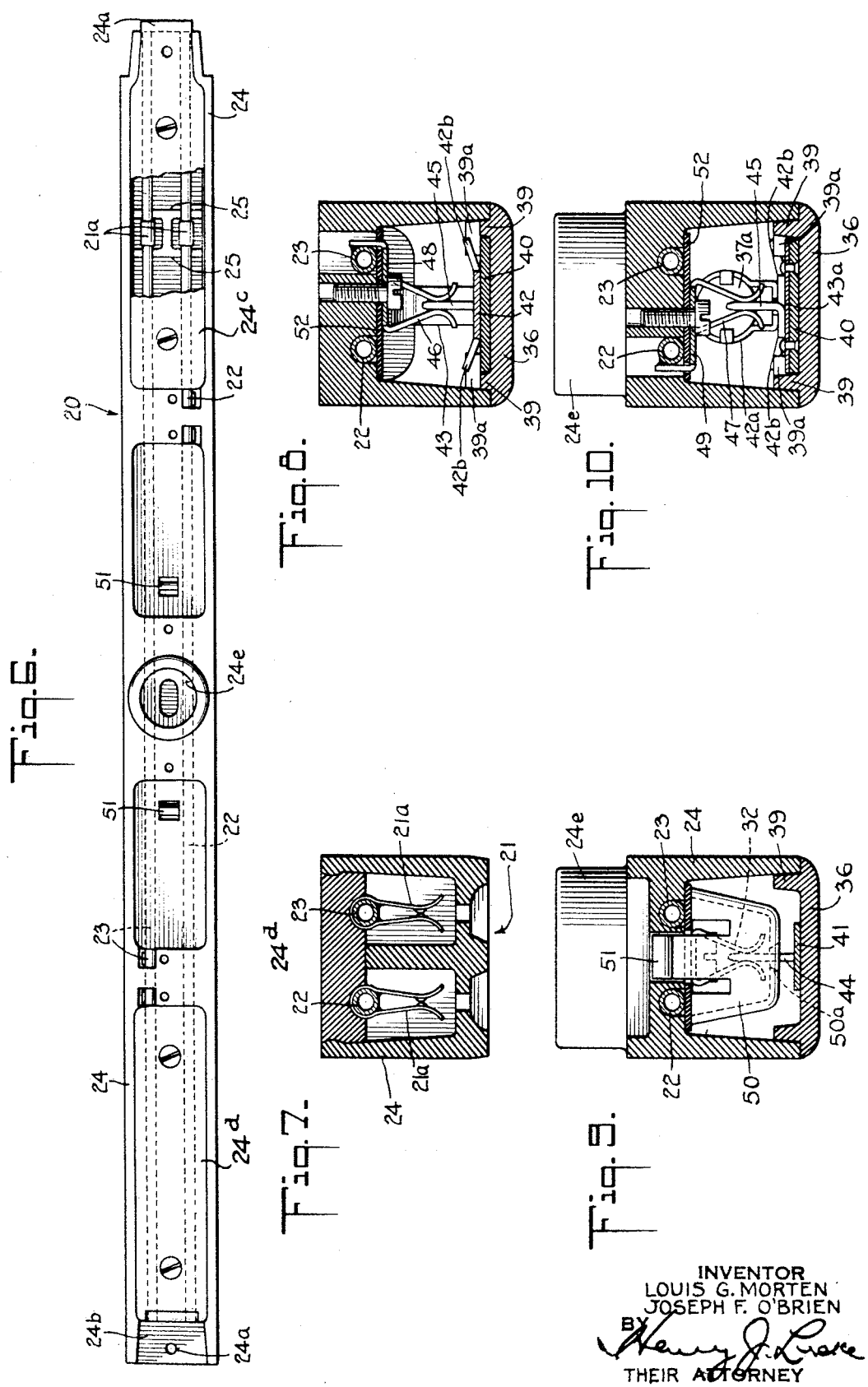

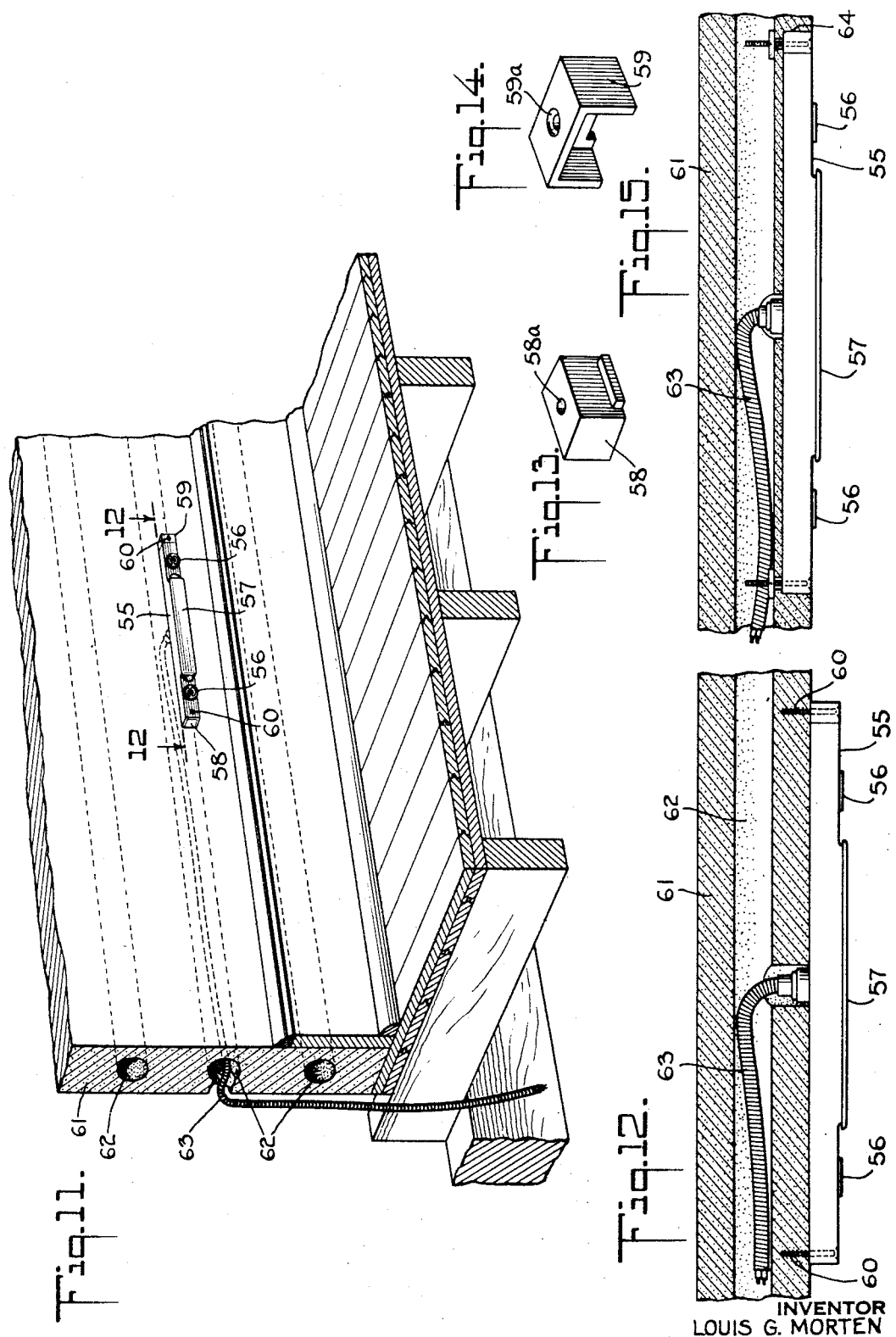

2,267,745

UNITED STATES PATENT OFFICE 2,267,745

FUSE PROVIDED ELECTRICAL DEVICE

Joseph F. O'Brien, Jersey City, and Louis G. Morten, Teaneck, N. J., assignors to John B. Pierce Foundation, New York, N. Y., a corporation of New York Application June 7, 1939, Serial No. 277,864

3 Claims. (Cl. 200—133)

Our invention relates to improvements in fused electrical devices.

As applied generally to electrical circuits, our invention provides for the housing of electrical conductors and removable closure for such housing and carrying fuse means for the electrical conductors, whereby upon removal of such closure the fuse means is held in position on such closure means and wholly free from electrical engagement with such conductors. Upon positioning such closure and the thereon mounted fuse means in operative relation with the housing, electrical connection is effected with the electrical conductors.

Our invention is particularly applicable to electrical devices of the nature of convenience outlets, switches, serially assembled outlet-provided units and the like, the electrical conducting parts of which are energized by connection through a BX or other cabled wiring with the electrical source.

In preferred forms of our invention, the terminals of the energizing wiring are substantially enclosed within a shroud-like member in a suitable housing, the electrical conductors of the outlet-provided device being located in the housing, the housing being provided with a removable cover as the closure member, the one or more fuse elements being mounted on suitable mounting members having contact elements and carried on the inner face of such cover, such shroud-like member being provided with appropriate apertures for affording insertion therethrough of such contact elements when the cover is positioned on the housing to close the same.

Upon removal of the cover and therewith the one or more fuse elements, the fuse elements may be grasped at random without danger of making contact with any "live" conductor, thus affording optimum inspection, safety and, if necessary, replacement. Also, upon removal of the cover, the "live" terminals and other conducting parts of the BX cable or other energizing circuit are effectively precluded from human contact.

A feature of the mounting assembly of the one or more fuse elements upon a cover or other removable base, resides in attaching such fuse element or elements thereon by means which is locked in position by the movement of the cover or other removable base to circuit-closing position. Advantageously, such fuse mounting means is secured to the cover or other removable base by sliding movement in a direction whereby the mounting means is precluded from displacement when the cover or other removable base is moved to circuit-closing position.

A feature of the invention resides in mounting the one or more fuse elements on a cover or other removable base and in means for retaining such cover or base effective by a snap action in the movement of the cover or base to circuit-closing position and to circuit-opening position as by one or more resilient retaining elements having hook end or other cam formation. This feature is advantageously coordinated with the stated fuse mounting arrangement by securing such hook end or other cam formed cover or base retaining means to the fuse mounting member.

Further features and objects of the invention will be more fully understood from the following detail description and the accompanying drawings, in which:

Fig. 1 is a top plan view of one type of embodiment of our invention;

Fig. 2 is a central sectional elevation on line 2—2 of Fig. 1;

Fig. 3 is a top plan view of Fig. 1, with the cover removed, certain parts of the housing broken away and other parts in horizontal section;

Fig. 4 is a detail bottom plan view of the cover, one of the fuse elements being shown in position, the other fuse element and its mounting member being removed;

Fig. 5 is a plan view of the removed fuse mounting member;

Fig. 6 is a rear view of Fig. 2, the cable being removed;

Fig. 7 is a detail sectional view on line 7—7 of Fig. 2, on an enlarged scale;

Fig. 8 is a detail sectional view on line 8—8 of Fig. 2, on an enlarged scale;

Fig. 9 is a detail sectional view on line 9—9 of Fig. 2, on an enlarged scale;

Fig. 10 is a detail sectional view on line 10—10 of Fig. 2, on an enlarged scale;

Fig. 11 is a perspective view of another type of embodiment of our invention, illustrated as a convenience outlet applied to an aperture-provided panel or other wall element;

Fig. 12 is a detail sectional view on line 12—12 of Fig. 11, on an enlarged scale;

Figs. 13 and 14 are detail perspective views of end parts of the convenience outlet of Fig. 11, on an enlarged scale; and Fig. 15 is a detail sectional view similar to Fig. 12, but showing the convenience outlet flush with the wall panel or element.

Referring to Figs. 1 through 10 of the drawings, the type of embodiment of our invention therein illustrated is particularly applicable to an extension or system of serially-connected sections, suitable as a molding or the like.

Referring more particularly to the construction of the embodiment illustrated in Figs. 1 through 8, the section 20 may have one or more outlets 21 as preferred. As appears more clearly from Figs. 3 and 6 through 10, the conductors 22, 23, shown two in number for illustration, are wholly housed within a suitably contoured body 24 of suitable material. Advantageously, the material of the body 24 is a plastic and possesses electrical insulating qualities. Such body 24 may be molded as generally hollow, with appropriate transverse ribs such as indicated at 25, 25, etc. for strength-effecting purposes, and also for sub-housing particular parts such as the spring clips 21a, 21a, see Fig. 3, of an outlet 21. The housing, per se may be molded of component parts, suitably assembled on screws or the like as indicated.

Such component parts of the housing 24 may include removable plate-like members 24c, 24d, which as shown in Fig. 7, serve to back the conductors 22, 23 and restrain the displacement thereof during the stage of inserting a conventional outlet plug for electrical connection with the spring clips 21a, 21a.

As applied to such serially connected system of sections, the section 20 represents the section in which a BX or other cable 26 carrying energizing wires 27, 28, are afforded connection with the conductors 22, 23 of the section 20. Mechanical and electrical connection with the adjacent and therewith remaining serially connected sections, may be provided by a right hand end formation 24a, see Figs. 1, 2 and 3, for male connection, and the opposite i. e., left hand end with a female, i. e., socket formation 24b The electrical conductors of the respective sections are disposed in substantial alignment when the sections are mechanically assembled and are preferably of tubular copper, suitable interconnecting copper elements serving to interconnect the respective conductors The energizing wires 27, 28 are shown having their terminals connected to conductor plates 29, 30, as by means of set screws 31, such conductor plates being respectively provided with clip terminals 32, 33. Such conductor plates are secured to the housing 20 by screws, or the like.

Suitable means including fuse means, i. e., one or more fuse elements, are provided for effecting electrical connection of such terminals 32, 33, with the conductors 22, 23, respectively, of the section 20. As one form of such fuse-provided connecting means and exemplary of a primary feature of our invention, we have illustrated the section 20 as provided with a closable opening shown extending from the transverse rib 34 to the transverse rib 35 and a cover 36 serving as the closure for such opening. In the illustrated instance, two fuse elements 37, 38 are shown, applicable for connection between the supply wires 27, 28 and the respective conductors 22, 23. Such cover 36 is preferably of electrical insulating material, and advantageously of the same or comparable composition as the plastic or equivalent of the body 24 of the section 20.

Preferably, each fuse element 37, 38, is mounted individually relative to the cover 36 and on its under, i. e. inner face 36a, for which purpose suitable means such as the retaining strips 39, 39 are secured, preferably integrally molded, relative to the material of the cover 36. Combined with the retaining strips 39, 39, we have shown as one form of mounting member, a plate 40 of fiber or other suitable material upon which are insulatively mounted clip terminals 41, 42, see Figs. 4 and 5, the terminals 41, 41a, and 42, 42a, of which respectively engage and make good electrical contact with the opposite terminals 37a, 37b, of the respective fuses 37, 38.

For effective securement of the cover 36 in its closed position, and also for attaining a "snap" electric circuit closure movement of the terminals carried by the cover 36 relative to their stated respective terminals, we provide the spring elements 43, 43, having hooked terminal formations 43b cooperating with the angular edge formations 34a, 35a of the transverse body ribs 34, 35.

Desirably such fuse mounting members 40 are positioned by sliding movement relative to the retaining strips 39, for which purpose the strips 39, 39 are provided with oppositely positioned, mutually projecting lugs 39a, 39a, and 39b, 39b functioning as groove elements, the fuse mounting members being definitely located in position by the lugs 39a, 39a, serving as stops for abutting engagement with the laterally projecting bases 43a of the snap closure elements 43; the clip terminal 42 is shown provided with the bendable oppositely disposed lugs 42b, 42b, which may be bent to engage the lugs 39a, 39a of the strips 39, thereby anchoring the mounting member 40 in its determined position.

Secured to each of the mounting members 40, at their respective inward ends, are clip terminals 44, 44, respectively for engagement with the terminals 32, 33 of the conductor plates 29, 30, connected, as above set forth, with the "live" wires 27, 28.

At the outward ends of each mounting member 40, a terminal 45 is provided for engagement with the terminals 46, 47 of the contact plates 48, 49, in turn connected to the conductors 22, 23.

Accordingly, upon positioning the cover 36 in closure relation with the section or device 20, the respective terminals 44, 44, are brought into electrical engagement with the terminals 32, 33, connected to the "live" wires 27, 28, and the terminals 45, 45, respectively connected with the contacts 46, 47, connected to the conductors 22, 23, whereby the latter are brought into circuit through the respective fuses 37, 38, with the "live" wires 27, 28.

Preferably, the ends of the "live" wires 27, 28 and thereto connected conducting parts and terminals are effectively precluded from human contact by suitable means, such as a shroud-like protecting cover 50, which is provided with relatively small slots 50a for the passage therethrough of the terminals 44, 44. Such shroud-like or other protective cover is preferably of electrically insulating material and may be removably retained in position by the snap elements 51, 51.

As appears clearly from Figs. 2 and 3, the conductors 22, 23 extend from end to end of the body 24 of the section or unit 20. To protect from human contact the portions of conductors 22, 23 within the interior of the body 24, when the cover 36 is removed, the plate 52 of electrically insulating material is provided having suitable slots for the passage therethrough of such parts as the clip portions 51 of the shroud-like member 50, the tail-terminals of the contact plates 48, 49, etc.

Fig. 6 illustrates more clearly a manner of assembling the component parts of the section housing. The opening 24e at the back of the housing 24 provides for the entry of the cable wiring 27, 28. The perforations indicated in the male end 24a register with the perforations in the female or socket end 24b of the adjacent section for securement by screws or the like of the sections to one another and to a suitable support.

As above clearly set forth, our invention is not limited to application of any serially connected system of sectional units. In Fig. 11, we have illustrated a convenience outlet 55, which may be provided with one or more electrical outlets 56; the detail construction of the electrical conductors, the cover 52, the one or more fuses (not shown) and other structural details, may conform generally to the construction and arrangement illustrated in Figs. 1 through 10, and described hereinabove.

As a single convenience outlet as illustrated at 55 in Fig. 11, the electrical conductors may terminate at the locations of juncture with the outlet clips, see 21a, 21a, Fig. 3, for such one or two outlets 56, 56, or such conductors may extend to the opposite ends of the unit 55, and suitable end members, see 58, 59, see Figs. 13 and 14, of suitable insulating material, applied to the respective ends, provision being made for securement of such elements in closed position, as by screws 60, see Fig. 11, passing through the respective perforations 58a, 59a, in register with suitable openings in the housing material of the convenience outlet or unit 55. Such screws 60 may serve also to secure the convenience outlet or unit 55 in position relative to a wall or partition 61.

The particular wall material 61 is illustrated in Fig. 1 as a panel or other wall unit, which is per se provided with a through opening 62 which may be utilized for housing the BX or other cable 63.

As appears in Figs. 11 and 12, the convenience outlet or unit 55 is shown applied upon the face of the panel or other wall material 61. If preferred, and as is illustrated in Fig. 15, such convenience outlet or unit 55 may be positioned within a recess 64 formed or made within the material 61 of the panel or other wall or partition material, to locate the front face of the convenience outlet in substantial alignment with the facial plane of the wall material 61.

We claim:

1. In combination with electrical wiring leading from a source of electrical current, a hollow body, terminals connected to said electrical source wiring and mounted within said hollow body, substantially closed housing means enclosing said terminals and said thereto connected wiring, said substantially closed housing means having relatively small slots disposed in alignment with said terminals, electrical conductors insulatedly mounted in mutually spaced relation with one another within said hollow body, contact elements respectively connected with said electrical conductors, removable closure means associated with said hollow body for enclosing said electrical conductors and also enclosing said substantially closed housing means, fuse means carried by said removable closure means and contact means in circuit with said fuse means carried by said removable closure means and disposed thereon to enter said relatively small slots and respectively engage said terminals when said closure means is in closure position relative to said hollow body.

2. The combination of a hollow body, electrical wiring leading from a source of electrical current, terminals connected to said electrical wiring and disposed within said hollow body, hollow closure means enclosing said terminals, said hollow closure means being provided with apertures disposed in alignment with said terminals, electrical conductors disposed insulatedly in mutually spaced relation with one another within said hollow body and exteriorly of said hollow closure means, displaceable closure means for said hollow body, fuse means carried by said removable closure means and contact elements in the circuit with said fuse means carried by said removable closure means, said contact means being disposed when said removable closure means is in its closed position for respectively engaging said terminals and said electrical conductors.

3. In combination with electrical wiring leading from a source of electrical current, a hollow body, electrical conductors insulatedly mounted in mutually spaced relation with one another within said hollow body, contact elements respectively connected with said electrical conductors, removable housing means associated with said base for enclosing said contact elements, said removable housing means being provided with apertures disposed in alignment with said contact elements, removable closure means for said hollow body and enclosing said removable housing means, and fuse means and therewith respectively connected contact elements mounted on said removable closure means, said contact elements being arranged to be received within said apertures of said removable housing means and engaging said contact elements connected with said electrical conductors.

JOSEPH F. O'BRIEN.
LOUIS G. MORTEN.